United States Patent [19]

Migeon et al.

[11] 4,318,017

[45] Mar. 2, 1982

[54] ROTOR ASSEMBLY FOR ELECTRIC STEPPING MOTOR

[75] Inventors: Jean P. Migeon, Audeux; Claude Poix, Besancon, both of France

[73] Assignee: Timex Corporation, Waterbury, Conn.

[21] Appl. No.: 109,595

[22] Filed: Jan. 4, 1980

[51] Int. Cl.³ ............................................. H02K 15/00
[52] U.S. Cl. ................................... 310/42; 310/49 R; 310/83; 310/261
[58] Field of Search .................. 310/42, 44, 156, 261, 310/268; 58/23 D

[56] References Cited

U.S. PATENT DOCUMENTS

| | | | |
|---|---|---|---|
| 4,035,676 | 7/1977 | Adair | 310/42 |
| 4,060,745 | 11/1977 | Linscott, Jr. | 310/261 X |
| 4,067,101 | 1/1978 | Ono | 310/42 X |
| 4,079,279 | 3/1978 | Oudet et al. | 310/268 X |

FOREIGN PATENT DOCUMENTS 691778 5/1953 United Kingdom .
1268045 3/1972 United Kingdom .

*Primary Examiner*—Donovan F. Duggan
*Attorney, Agent, or Firm*—William C. Crutcher; Edward J. Timmer

[57] ABSTRACT

A rotor assembly for a stepping motor is provided by locating one flat side of a brittle annular rotor disc against an annular alignment surface on a hub and mounting the hub with aligned rotor disc thereon on a central shaft carrying an annular clamping washer. The clamping washer includes an inner peripheral portion which is clamped between first and second abutment surfaces on the shaft and hub and a resilient outer peripheral portion which bears axially against the other flat side of the rotor disc with a spring-like bias to clamp the disc in prealigned position on the hub. Required alignment of the brittle rotor disc is thereby achieved while minimizing the danger of breakage and also reducing the number of rotor components and assembly steps.

4 Claims, 5 Drawing Figures

ROTOR ASSEMBLY FOR ELECTRIC STEPPING MOTOR

FIELD OF THE INVENTION

This invention relates to an improved rotor assembly for an electric stepping motor and to an improved method for making the assembly.

DESCRIPTION OF THE PRIOR ART

Electric stepping motors are known which are driven by pulses from a transistorized circuit or other known equivalent circuits. The stepping motor generally includes a main magnetic circuit formed of a stator and a rotor with a coil magnetically coupled to the stator via one or more core members in the form of simple rectilinear or U-shaped steel or iron plates extending through the coil to the stators, for example, typical stepping motor constructions are illustrated in the Oudet U.S. Pat. No. 3,754,155 issued Aug. 21, 1973; the Schwarzchild U.S. Pat. No. 3,818,690 issued June 25, 1974; the Schwab et. al. U.S. Pat. No. 3,860,842 issued Jan. 14, 1975; the Kuwako et. al. U.S. Pat. No. 3,984,709 issued Oct. 5, 1976; the Kikuyama et. al. U.S. Pat. No. 3,989,967 issued Nov. 2, 1976 and the Oudet et. al. U.S. Pat. No. 4,079,279 issued Mar. 14, 1978.

The last mentioned Oudet et. al. patent (U.S. Pat. No. 4,079,279) discloses a stepping motor which employs a hard, brittle magnetic rotor disc. In fabricating a rotor assembly from such hard, brittle materials, prior art workers have experienced breakage problems and overall difficulty in handling such discs especially while attempting to precisely align and attach the rotor disc to a shaft that may include a pinion for driving the gear train of a timepiece. One scheme developed by prior art workers involves a rotor disc in the form of an annulus with a brass ring cemented in the center hole to provide stability for a molded plastic hub. The plastic hub includes an upper pinion section, an intermediate cylindrical hub section onto which the magnetic annulus with brass disc cemented thereto is press fit and a lower cylindrical section of slightly larger diameter than the hub section for supporting the rotor disc. A steel shaft is press fit into the plastic part to provide an axis for rotation. The rotor assembly is completed by press fitting a brass bushing on the shaft adjacent the pinion section of the hub to prevent axial movement of the plastic part on the shaft. It is apparent that this type of rotor assembly requires numerous components and assembly steps which add to its cost.

A copending U.S. Pat. application Ser. No. 109,594 filed Jan. 4, 1980 entitled "Rotor Assembly and Process For Making Same" filed in the name of Migeon and of common assignee herewith discloses an improved rotor assembly for a stepping motor and method for manufacturing the assembly. The rotor assembly is provided in accordance with that invention by locating one flat side of a brittle magnetic rotor annulus against a preformed annular alignment surface molded into a thermoplastic hub and then thermoplastically working localized portions of the hub adjacent the other flat side of the rotor to form in situ a second annular shoulder thereagainst to lock the rotor in the aligned position. Other localized portions of the hub are thermoplastically worked to form in situ an inner circumferential lip extending radially from the hub into a corresponding groove in the shaft supporting the hub, thereby preventing axial movement of the hub and rotor mounted thereon.

SUMMARY OF THE INVENTION

An object of the present invention is to provide an improved rotor assembly for a stepping motor and process for making the assembly which provide accurate alignment of the rotor and at the same time minimize the danger of breakage of the brittle rotor.

Another object of the invention is to provide such an improved rotor assembly and process which employ few assembly components and assembly steps.

In a typical embodiment of the present invention, the rotor assembly includes a central shaft having a first annular abutment surface projecting radially therefrom, a hub mounted on the shaft and having a second annular abutment surface projecting radially in spaced relation to the first abutment surface of the shaft and an annular rotor disc carried on the hub with one flat side located in prealigned position on the hub. An important feature of the invention is the placement of an annular clamping washer on the shaft with the washer having an inner peripheral portion clamped between the first and second abutment surfaces of the shaft and hub and a resilient outer peripheral portion which bears axially against the other flat side of the rotor disc to exert a springlike bias thereagainst, clamping the disc on the hub in the prealigned position. The danger of breakage of the brittle rotor disc is greatly reduced since the resiliency of the outer periphery of the clamping washer prevents build-up of excessive loads on the disc during assembly.

DESCRIPTION OF PREFERRED EMBODIMENTS

Figure 1:
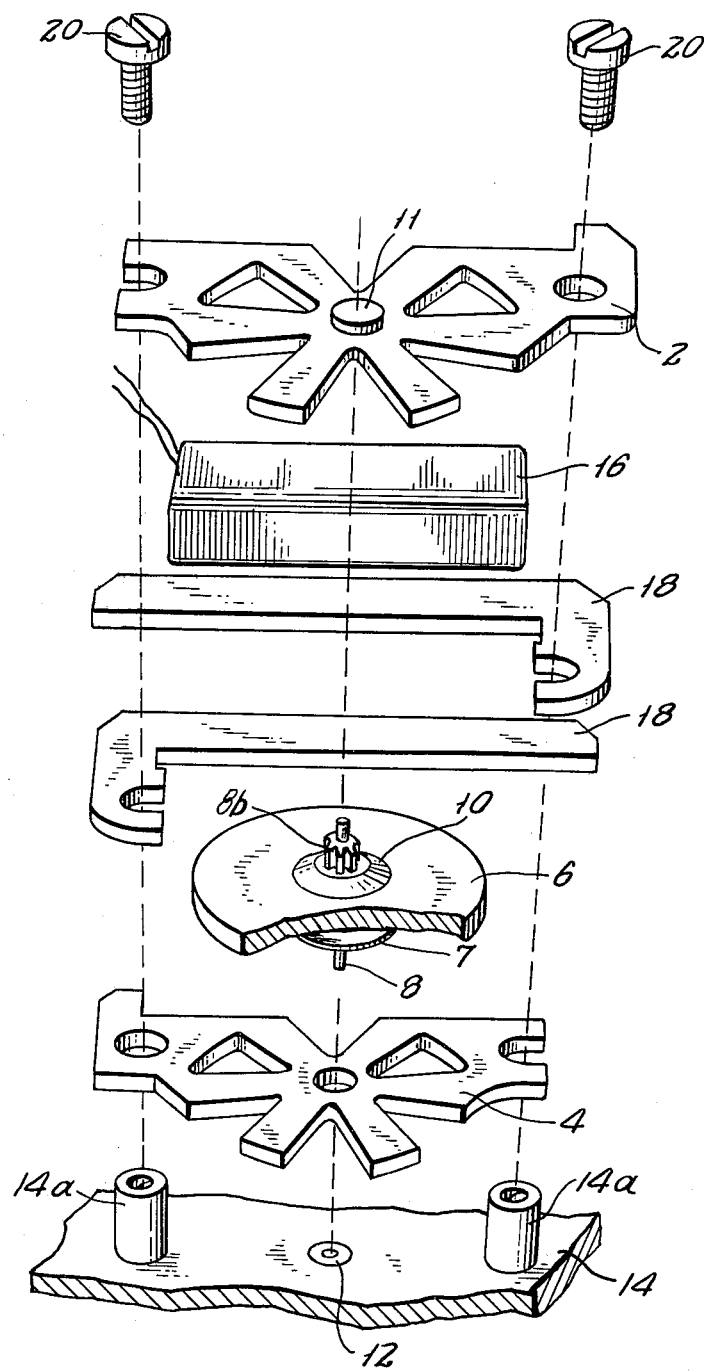
FIG. 1 is an exploded view of the components of a stepping motor.

FIG. 1 illustrates a stepping motor construction to which the present invention is applicable. Briefly, the stepping motor comprises an upper stator 2 and lower stator 4, both of magnetically permeable material, and a rotor 6 in the form of an annular disc of brittle magnetic material having a high coercive field. The rotor 6 is supported on hub 7 on central shaft 8 for rotation in the gap between the upper and lower stators. The central shaft in turn is supported at opposite ends by upper bearing 11 in the upper stator and lower bearing 12 in movement frame 14. A wound coil 16 which receives energizing current, for instance pulses of constant sign, is magnetically coupled to the upper and lower stators through L-shaped core members 18. The stepping motor is mounted on the movement frame 14 within a suitable housing (not shown) by means of support posts 14a and screws 20.

The stepping motor is preferably of the type illustrated in U.S. Pat. No. 4,079,279 issued Mar. 14, 1978 to Oudet et. al. which is incorporated herein by reference.

Figure 2:
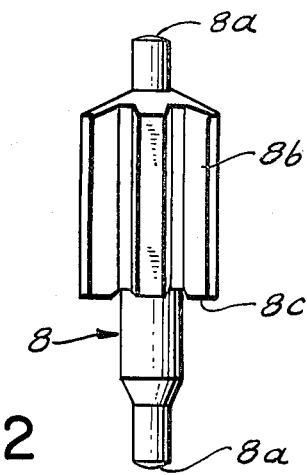
FIG. 2 is a side elevation of the central shaft.

FIG. 2 shows the central shaft 8 having burnished ends 8a for mounting and rotation in upper and lower bearings 11 and 12. On the upper portion of the central shaft is a pinion 8b which is adapted to drive the gear train of a timepiece, e.g. as shown in a copending patent application entitled "Gear Train For Timepiece With A Stepping Motor" filed in the name of Paul Wuthrich and of common assignee herewith, the teachings of which are incorporated herein by reference. As shown, the lower end of the pinion 8b includes a first annular abutment surface 8c which projects radially outward relative to the shaft. Of course, the first abutment surface 8c could be formed in other ways such as a separate formed collar on the shaft and the like.

Figure 3:
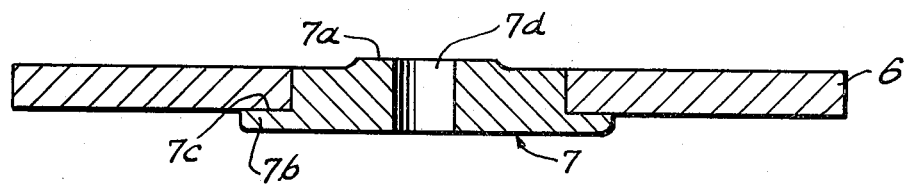
FIG. 3 is a cross-sectional view of the hub with rotor disc carried thereon.

FIG. 3 shows the hub 7 and annular rotor disc 6 located thereon. The hub is made of rigid material and includes a second annular abutment surface 7a projecting radially outward and also an annular, radially projecting shoulder 7b positioned axially therebelow and against which one flat side of annular rotor disc 6 is positioned. Shoulder 7b is formed to high tolerances to provide annular alignment surface 7c to insure proper initial positioning and alignment of the rotor disc on the hub. Hub 7 also includes a central cylindrical bore 7d to receive central shaft 8 in a press fit.

Figure 4:
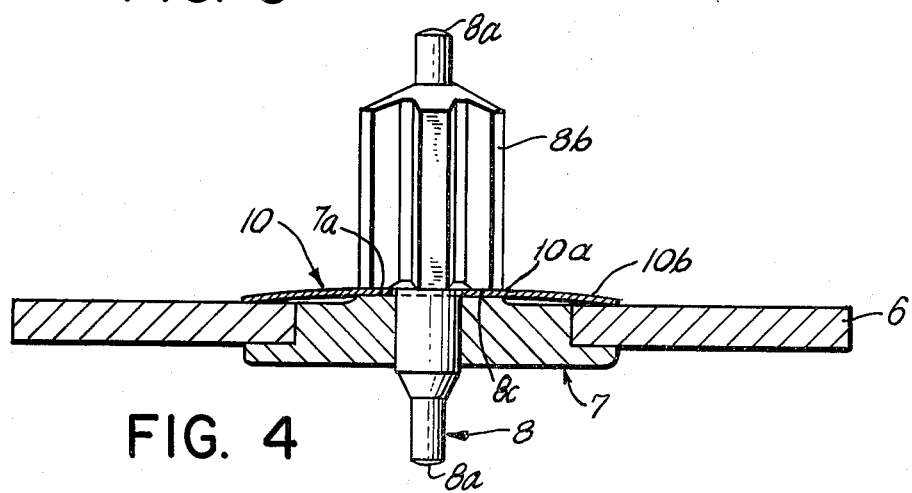
FIG. 4 is a partial cross-sectional view of a preferred rotor assembly embodiment.

FIG. 4 shows the completed rotor assembly of the invention with the hub 7 carrying the aligned rotor disc 6 mounted on the central shaft. An important feature of the assembly is the placement of an annular clamping washer 10 on the shaft between the first and second abutment surfaces. As shown, the washer 10 includes a generally flat inner peripheral portion 10a clamped securely between first and second abutment surfaces 8c and 7a of the shaft and hub, respectively, and a downwardly bent resilient outer peripheral portion 10b which bears axially against the facing flat side of the rotor disc with a springlike action toward the alignment surface 7c of the hub to clamp the rotor disc in the preselected, aligned position on the hub. Preferably, the washer 10 is made of aluminum suitably bent into the desired configuration. It is important that at least the outer peripheral portion 10b of the washer be resilient to exert a spring-like bias axially against the rotor disc to clamp it onto the hub 7.

The rotor disc 6, which is made of a brittle magnetic material, is thus properly positioned and aligned on the central shaft while minimizing the possibility of breakage thereof. It is apparent that the rotor assembly of the invention is of simple construction and employs only four components.

In manufacturing the rotor assembly of FIG. 4, the annular washer 10 is positioned on the shaft 8 against first abutment surface 8c, the rotor disc 6 is positioned on hub 7 with one flat side against alignment surface 7c and then the hub carrying the rotor disc is press fit onto shaft 8 with the second abutment surface 7a brought to bear against the inner peripheral portion 10a of the washer to securely clamp it between the first and second abutment surfaces. Simultaneously, the outer peripheral portion 10b of the washer is brought to bear against the other flat side of the rotor disc and, being resilient, exerts a spring-like bias axially against that side of the rotor disc to clamp the disc on the hub in the prealigned position. Thus, assembly of the rotor components is very simple and may be effected by automated machinery. The danger of breakage of the brittle rotor disc is greatly reduced since the resiliency of the outer peripheral portion 10b of the washer prevents build-up of excessive loads on the disc during assembly.

Figure 5:
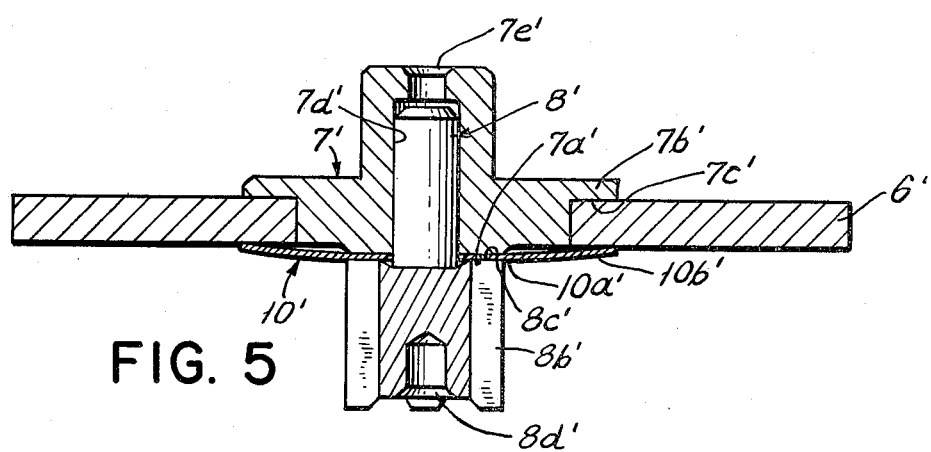
FIG. 5 is a partial cross-sectional view of another preferred rotor assembly embodiment.

FIG. 5 illustrates a somewhat different arrangement of the rotor components to provide pocket holes in the assembly for mounting rotationally. This assembly includes central shaft 8' having a pinion 8b' on the lower end and pocket hole 8d' at the lower end to receive a suitable support shaft. The central shaft also includes first annular abutment surface 8c' at the upper end of the pinion. Hub 7' includes second annular abutment surface 7a' as well as annular shoulder 7b' with alignment surface 7c' formed to high tolerances therein. The hub includes a cylindrical bore 7d' extending toward the top end thereof to receive the top portion of the central shaft. The top end of the hub 7' is configured to provide a pocket hole 7e' to receive a support shaft. Finally, annular washer 10' includes flat inner peripheral portion 10a' clamped between the first and second abutment surfaces and an upwardly bent outer peripheral portion 10b' which bears axially against the facing flat side of rotor disc 6' to clamp it against alignment surface 7c' on the hub.

While there has been described what are herein considered to be the preferred embodiments of the invention, other modifications will occur to those skilled in the art, and it is desired to cover in the appended claims all other modifications as fall within the true spirit and scope of the invention.

We claim:

1. A rotor assembly useful for a stepping motor, comprising:
   (a) a central shaft having a pinion thereon, the pinion having an end surface forming a first annular abutment surface projecting radially therefrom intermediate the shaft ends,
   (b) a hub mounted on intermediate portions of said shaft and having a second annular abutment surface projecting radially therefrom in spaced, facing relationship to the first annular abutment surface of said shaft,
   (c) an annular clamping washer having an inner peripheral portion clamped between the first and second abutment surfaces of said shaft and hub and having a resilient outer peripheral portion, and
   (d) an annular rotor disc having oppositely facing flat sides with one side located on the hub in a preselected axial position and the other side facing the clamping washer with the resilient outer peripheral portion of said washer bearing axially against said other side to clamp the rotor disc in preselected axial position on the hub.

2. A rotor assembly useful for a stepping motor, comprising;
   (a) a central shaft having a first annular abutment surface projecting radially therefrom intermediate the shaft ends,
   (b) a hub mounted on intermediate portions of said shaft and having a second annular abutment surface projecting radially therefrom in spaced, facing relationship to the first annular abutment surface of said shaft, and wherein the hub includes an annular, radially projecting shoulder preformed at a selected axial position remote from said second abutment surface to accommodate and locate said one flat side of the rotor disc,
   (c) an annular clamping washer having an inner peripheral portion clamped between the first and second abutment surfaces of said shaft and hub and having a resilient outer peripheral portion, and
   (d) an annular rotor disc having oppositely facing flat sides with one side located on the hub in a preselected axial position and the other side facing the clamping washer with the resilient outer peripheral portion of said washer bearing axially against said other side to clamp the rotor disc in preselected axial position on the hub.

3. A rotor assembly useful for a stepping motor, comprising:
(a) a central shaft having a first annular abutment surface projecting radially therefrom intermediate the shaft ends,
(b) a hub mounted on intermediate portions of said shaft and having a second annular abutment surface projecting radially therefrom in spaced, facing relationship to the first annular abutment surface of said shaft,
(c) an annular clamping washer having an inner peripheral portion clamped between the first and second abutment surfaces of said shaft and hub and having a resilient outer peripheral portion, and wherein the annular washer includes a generally flat inner peripheral portion to facilitate clamping between said first and second abutment surfaces and an outer peripheral portion bent at an angle from the flat inner peripheral portion towards that other flat side of the rotor disc to provide a spring-like bias there against, and
(d) an annular rotor disc having oppositely flat sides with one side located on the hub in a preselected axial position and the other side facing the clamping washer with the resilient outer peripheral portion of said washer bearing axially against said other side to clamp the rotor disc in preselected axial position on the hub.

4. The assembly of claim 3 wherein the annular washer is formed aluminum.

* * * * *